US012661925B2

(12) United States Patent
Gourdin et al.

(10) Patent No.: US 12,661,925 B2
(45) Date of Patent: Jun. 23, 2026

(54) DIGITAL EMBOSSING OF DECORATIVE SURFACE COVERINGS

(71) Applicant: TARKETT GDL, Lentzweiler (LU)

(72) Inventors: Diego Gourdin, Wiltz (LU); Richard Peres, Wiltz (LU); Jean-Yves Simon, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 75 days.

(21) Appl. No.: 18/707,042

(22) PCT Filed: Nov. 16, 2022

(86) PCT No.: PCT/EP2022/082097

§ 371 (c)(1),
(2) Date: May 2, 2024

(87) PCT Pub. No.: WO2023/088944

PCT Pub. Date: May 25, 2023

(65) Prior Publication Data

US 2025/0010656 A1 Jan. 9, 2025

(30) Foreign Application Priority Data

Nov. 17, 2021 (LU) ........................................ 500871

(51) Int. Cl.
*B44C 5/04* (2006.01)
*B41J 3/38* (2006.01)
(Continued)

(52) U.S. Cl.
CPC *B44C 5/04* (2013.01); *B41J 3/38* (2013.01); *B41M 3/06* (2013.01); *B44C 3/025* (2013.01)

(58) Field of Classification Search
CPC .. B44C 3/025; B44C 5/04; B41M 3/06; B41J 3/38
See application file for complete search history.

(56) References Cited

U.S. PATENT DOCUMENTS 4,017,658 A * 4/1977 Bomboire ................. B44C 3/08 428/172
4,247,353 A * 1/1981 Courtoy .................. B44C 3/025 156/277
(Continued)

FOREIGN PATENT DOCUMENTS

EP 3838581 A1 6/2021
WO 2017/046309 A1 3/2017

OTHER PUBLICATIONS

International Search Report, International Patent Application No. PCT/EP2022/082097, dated Feb. 13, 2023, 3 pages.
(Continued)

*Primary Examiner* — Vishal I Patel
(74) *Attorney, Agent, or Firm* — FITCH EVEN TABIN & FLANNERY, LLP

(57) ABSTRACT

Aspects of the present invention relate to a resilient multi-layer decorative surface covering and a method for producing a resilient multilayer decorative surface covering. The method comprises providing a substrate (36) and digitally embossing a coating on the substrate. Digitally embossing the coating comprises applying a plurality of plastisol or organosol layers (40*a*, 40*b*) so as to produce a coating having a three-dimensional surface relief, wherein at least one of the plurality of plastisol or organosol layers is structurally patterned.

13 Claims, 4 Drawing Sheets

(51) Int. Cl.
*B41M 3/06* (2006.01)
*B44C 3/02* (2006.01)

(56) References Cited

U.S. PATENT DOCUMENTS 5,487,929 A 1/1996 Rusincovitch, Jr. et al.
2021/0187823 A1 * 6/2021 Macor .................. B29C 64/188

OTHER PUBLICATIONS

Written Opinion, International Patent Application No. PCT/EP2022/082097, dated May 25, 2023, 6 pages.

* cited by examiner

DIGITAL EMBOSSING OF DECORATIVE SURFACE COVERINGS

FIELD OF THE INVENTIONS

The invention generally relates to a multilayer decorative surface covering and method for producing a resilient multilayer decorative surface covering, the multilayer decorative surface covering having a coating comprising a three-dimensional surface relief.

BACKGROUND OF THE INVENTION

A multilayer surface covering (e.g. a wall, floor or ceiling covering) typically comprises a plurality of layers that differ in their functions and compositions. A typical layer stack for multilayer surface coverings comprises a backing layer, one or more core layers, a décor layer, a wear layer and/or a topcoat.

The décor layer may be a layer of a natural material, e.g. cork, wood. Alternatively of additionally the décor layer may comprise or consist of a printed décor, imitating (or not) a natural material. The surface covering may be embossed so as to provide a surface structure for improving the look and feel of the décor layer (e.g. for adding more realism such as reproducing the texture of a wood knot).

Usually, embossing involves pressing a plate or cylinder having a three-dimensional structure against the surface covering under high temperature so as to transfer the three-dimensional pattern into the surface covering.

WO 2017/046309 A1 discloses a base panel suitable to be processed into a covering panel, consisting of: (i) a substrate having a top surface, (ii) a resilient layer having a top surface and a bottom surface, the bottom surface being connected to the top surface of the substrate, and (iii) optionally, a contact layer between the bottom surface of the resilient layer and the top surface of the substrate. The covering panel comprises a digitally printed décor on the top surface of the resilient layer of the base panel. The covering panel may further be provided with an embossing pattern, which may be applied in register with the print, so as to accentuate the appearance of the décor.

GENERAL DESCRIPTION

A first aspect of the invention pertains to a method for producing a resilient multilayer decorative surface covering. The surface covering may be a floor, wall or ceiling covering. The method comprises providing a substrate. The method further comprises digitally embossing a coating on the substrate. Digitally embossing the coating on the substrate comprises applying a plurality of plastisol or organosol layers so as to produce a coating having a three-dimensional surface relief. At least one of the plurality of plastisol or organosol layers is structurally patterned.

As used herein, "digitally embossing" designates a technique of embossing on a substrate based on digital template. In other words, digital embossing is a digitally (computer-) controlled deposition and immobilization of material (e.g. (PVC) resin in a solvent—e.g. a plasticizer and/or an organic solvent) in (pre-) defined patterns onto a surface. Various digital embossing techniques may be envisioned for the present invention, examples of which will be disclosed hereinafter.

As used herein, the term "plastisol" designates a fluid suspension or dispersion of a polymer resin (e.g. PVC, polyvinyl acetate, PMMA) and a compatible plasticizer.

Examples of possible compatible plasticizers comprise the examples disclosed in the next paragraph as well as the ones listed for the first and second plasticizers (see below). A plastisol may also comprise a mixture of plasticizers. A PVC plastisol may contain from 15 to 200 parts of plasticiser per 100 parts of polyvinyl chloride resin.

Possible plasticizers include phthalate-based plasticizers or non-phthalate based plasticizers such as, e.g., terephthalates, trimellitates, alkyl citrates, adipates, sebacates, benzoates, maleates, etc. Examples of possible plasticizers include dinormalhexyl phthalate (DnHP), diisoheptyl phthalate (DIHP), diheptyl phthalate (DnHP), di(2-ethylhexyl) phthalate (DEHP), diheptylnonyl phthalate (DnHNP), dinormaloctyldecyl phthalate (DNODP), diheptylnonylundecyl phthalate (DnHNUP), diisononyl phthalate (DINP), dinonyl phthalate (DNP), dinormalnonyl phthalate (DnNP), diisodecyl phthalate (DIDP), dinormalnonyldecylundecyl phthalate (DnNDUP), dinonylundecyl phthalate (DnNUP), diundecyl phthalate (DUP), diisoundecyldodecyl phthalate (DUDP), ditridecyl phthalate (DTDP), di(2-ethylhexyl) teraphthalate (DOTP), butylbenzyl phthalate (BBP), diheptylnonyl adipate (DnHNA), di(2-ethylhexyl) adipate (DEHA), diisononyl adipate (DINA), diisodecyl adipate (DIDA), triheptylnonyl trimellitate (TnHNTM), tri(2-ethylhexyl) trimellitate (TOTM), triisononyl trimellitate (TINTM), di(2-ethylhexyl) sebacate (DOS), di(2-ethylhexyl) azelate (DOZ), dioctyl phthalate (DOP) and 1,2-cyclohexane dicarboxylic acid diisononyl ester (DINCH).

As used herein, the term "organosol" designates a fluid suspension or dispersion of a polymer resin (e.g. PVC, polyvinyl acetate, PMMA) and an organic solvent. Optionally, the dispersion also comprises one or more compatible plasticizers, such as the ones contemplated in the present document.

Examples of organic solvents include white spirit, biodiesel xylene, toluene, acetone, butyl acetate.

Additives such as stabilizers, viscosity reducers, antistatic agents, fire retardants, lubricants and processing aids, may also be added.

Examples of stabilizers are benzotriazole and benzophenone compounds to reduce the degradation by sunlight and stabilizers to provide stability during heat processing which are typically metal compounds, particularly lead salts, organotin compounds, barium, cadmium and zinc salts and calcium/zinc stabilisers.

Examples of viscosity reducers are aliphatic hydrocarbons such as Viscobyk® 4010, 4013, 4015 and 4040, carboxylic acid derivates such as Viscobyk® 5025, 5125 and 5050, Jayflex® 615 or Exxsol® D100, dodecyl benzene such as Jayflex® 602, specialty esters based on oleates and laurates, 2,2,4-trimethylpentanediol diisobutyrate, C3 to C17 esters of 1,2,4-trimethyl-1,3-pentanediol, C3 to C17 esters of 1,2,4-trimethyl-1,3-pentanediol monoisobutyrate and mixtures thereof.

Examples of antistatic agents are cationic, non-ionic or anionic in nature and generally are selected from the group consisting of amides and amines, quaternary ammonium compounds, polyalkylene glycol derivatives, sulphates and sulphonates, and miscellaneous ethers and esters. Typical examples of antistatic agents are lauramidopropyl-trimethylammonium methosulfate, myristamidopropyl-trimethylammonium methosulfate, stearamidopropyl-trimethylammonium methosulfate and stearamidopropyl-dimethyl-beta-hydroxyethylammonium dihydrogen phosphate. The antistatic agents reduce build-up of static charges and to promote charge dissipation in their products.

Examples of fire retardants include halogen containing compounds and phosphorous containing organic compounds such as triaryl, trialkyl or alkyl diaryl phosphate esters. Other materials that may be used include chloroparaffins, aluminum trihydrate or antimony oxides. The fire retardants are admixed to the compositions of the present invention in order to increase ignition time, reduce flame spreading and rate of burning.

Examples of lubricants and processing aids include stearic acid, metal stearates, petroleum waxes, silicon oil, mineral oil, synthetic oils and polyethylene waxes.

Heating of a plastisol causes physical changes in the flowability of the plastisol. In particular, as the temperature of the plastisol is raised, the particles of polymeric material gradually absorb the plasticizer on their surfaces, whereby the particles swell and the fluidity of the plastisol decreases. The fluid suspension or dispersion gradually turns into a gelled dispersion and finally into a "fused" dispersion, corresponding to a state of mutual dissolution of the plasticizer and the polymer (cf. e.g. SPI Plastics Engineering Handbook, M. Berins, 5th edition, 1994, p. 452, FIG. 16-5). Therefore, unless otherwise apparent from context, the term "plastisol" may designate the fluid suspension or dispersion and also the fused dispersion or any intermediary state.

A "three-dimensional surface relief" designates a surface that is uneven, comprising e.g. recesses and/or protrusions (i.e. depressed and/or raised regions), and deviates from a flat surface. In the context of the present invention, the surface roughness provided by three-dimensional surface relief is greater than the intrinsic surface roughness of the bulk material. As would be readily understood, the three-dimensional surface relief is provided on the surface of the coating facing away from the substrate. The coating is preferably the topmost layer of the resilient multilayer decorative surface covering. In this way the three-dimensional surface relief is the apparent surface of the resilient multilayer decorative surface covering.

As used herein, a structurally patterned layer is a layer having a pattern in its structure. In other words, the layer is structured.

It will be appreciated that the present invention allows for creating virtually any three-dimensional surface relief, and especially improves the repetition rate of the surface relief created by embossing plates or cylinders. Indeed, embossing plates or cylinders usually have a repetition rate corresponding to the number of used plates and the perimeter of the cylinder, respectively.

The application of the plurality of plastisol or organosol layers may comprise depositing, e.g. in a pattern, plastisol or organosol on the substrate so as to produce a plastisol or organosol layer that is structurally patterned. In other words, regions where plastisol or organosol was deposited create a locally raised pattern. Conversely, the other regions are depressed with respect to the regions where plastisol or organosol was deposited. For example, the deposition of plastisol or organosol may comprise depositing one or more plastisol or organosol blobs on the substrate.

According to an embodiment, the application of the plurality of plastisol or organosol layers comprises gelling one or more plastisol or organosol layers that are already applied on the substrate, preferably before applying a further plastisol or organosol layer.

According to an embodiment, the application of the plurality of plastisol or organosol layers may comprise:

depositing plastisol or organosol on the substrate, the plastisol or organosol comprising a first plasticizer having a first solution temperature at the clear point, the plastisol or organosol having an initial gelation temperature;

applying, in a pattern, a second plasticizer on the deposited plastisol or organosol, the second plasticizer having a second solution temperature at the clear point, the second solution temperature at the clear point being different from the first solution temperature at the clear point, so as to impart to the deposited plastisol or organosol a spatially modulated gelation temperature between a lowest gelation temperature and a highest gelation temperature;

heating the plastisol or organosol to a heating temperature comprised between the lowest gelation temperature and the highest gelation temperature of the plastisol or organosol so as to selectively gel the plastisol or organosol in areas where the gelation temperature is lower than the heating temperature; and removing the plastisol or organosol so as to keep the selectively gelled plastisol or organosol areas on the substrate, thereby producing a structurally patterned plastisol layer;

wherein solution temperature measured according to DIN 53408:1967-06 (5% S-PVC; K-value 71).

The solution temperature at the clear point (also known as the solid-gel transition temperature) is the temperature at which a homogeneous phase is formed from a polyvinyl chloride dispersion in a plasticizer (L. Meier: "Weichmacher", in R. Gachter, H. Muiller (Ed.): Taschenbuch der Kunststoffadditive, 3rd Edition, pp. 361-362, Hanser Verlag, Munich 1990). Plasticizers with a low solution temperature permit fast processing that saves energy. They are usually referred to as fast-fusing plasticizers, when compared to other plasticizers having a higher solution temperature, i.e. so called slow-fusing plasticizers.

As used herein, the "gelation temperature" is a measure of plasticizer activity and is the temperature at which a single grain of the resin (e.g. PVC) dissolves in excess plasticizer.

The "K-value" relates the mean molecular weight of polyvinyl chloride. The K value is the viscosity of a solution of 0.005% by weight of the polyvinyl chloride in cyclohexanone at 25° C. as measured using an Ubbelhode viscometer. The K-value is the German standard DIN 53726. A low K-value indicates low mean molecular weight. Conversely, a high K-value indicates a high mean molecular weight. The fusion temperature and gelation rate of the plasticised polyvinyl chloride composition depend on the K-value. Typically, high K-values indicate better mechanical properties but the lower the flowability of the plastisol.

The first plasticizer may be selected from the group consisting of the alkyl esters of cyclohexane dicarboxylic acids, the dial-kyl esters of aliphatic dicarboxylic acids and the alkyl esters of aromatic di-, tri-, or tetra-carboxylic acids, with the exception of orthophthalic acid.

Examples of alkyl esters of cyclohexane dicarboxylic acids are diisobutyl-, diisopentyl-, diisohexyl-, di-2-ethylhexyl-, dicyclohexyl-, di-n-heptyl-, diisoheptyl-, di-n-octyl-, diisooctyl-, di-n-nonyl-, diisononyl-, di(3,5,5-trimethyl hexyl)-, di(2,6-di methyl-4-heptyl)-, di-n-decyl-, diisodecyl-, di-2-propyl heptyl-, di-n-undecyl-diisoundecyl-, di-n-dodecyl-, diisododecyl-, di-n-tridecyl-, diisotridecyl-, di-n-tetradecyl-, di-n-hexadecyl-, di-n-octadecyl-, diisooctadecyl esters of 1,2-cyclohexane dicarboxylic acid, of 3-methyl-1,2-cyclohexane dicarboxylic acid, of 4-methyl-1,2-cyclohexane dicarboxylic acid, of 1,4-cyclohexane dicarboxylic acid, and of 3-methyl-1,4-cyclohexane dicarboxylic acid.

Examples of dialkyl esters of aliphatic dicarboxylic acids are diheptyl-, dioctyl-, dinonyl-, dodecyl-, diundecyl-, didodecyl-, ditridecyl-, ditetradecyl-, dihexadecyl-, dioctadecyl-, dicyclohexyl-, diisoheptyl-, di(3,5,5-trimethyl hexyl)-, di(2, 6-di methyl-heptyl)-, diisooctyl-, diisononyl-, diisodecyl-, diisoundecyl-, diisododecyl-, diisotridecyl-, di-2-ethylhexyl-di-2-propyl heptyl-, diisooctadecyl esters of adipic and azelaic acid.

Examples of alkyl esters of aromatic di-, tri-, or tetracarboxylic acids, with the exception of orthophthalic acid are dicyclohexyl-, di-n-octyl-, diisooctyl-, di-2-ethylhexyl-, di-n-nonyl-, diisononyl-, di-n-decyl-, diisodecyl-, di-n-undecyl-, diisoundecyl-, di-n-docecyl-, diisododecyl-, di-n-octadecyl-, diisooctadecyl-, di-n-eicosyl esters of isophthalic and terephthalic acid, tricyclohexyl-, tri-2-ethylhexyl-, tri-n-octyl-, triisooctyl-, tri-n-nonyl-, triisononyl-, tri-n-decyl-, triisodecyl-, tri-n-undecyl-, triisoundecyl-, tri-n-dodecyl-, triisododecyl-, tri-n-octadecyl-, triisooctadecyl-, tri-n-eicosyl esters of trimellitic acid or its anhydride, tetracyclohexyl-, tetra-2-ethylhexyl-, tetra-n-octyl-, tetraisooctyl-, tetra-n-nonyl-, tetraisononyl-, tetra-n-decyl-, tetraisodecyl-, terta-n-undecyl-, tetraisoundecyl-, tetra-n-dodecyl-, tetraisododecyl-, tetra-n-octadecyl-, tetraisooctadecyl-, tetra-n-eicosyl esters of pyromellitic acid or its anhydride.

All the individual combinations of the above-mentioned first plasticizers are also contemplated.

The second plasticizer may be selected from the group consisting of the lower alkyl esters of aromatic diacids, benzoates, citrates, phosphates, and sulfonates.

Examples of lower alkyl esters of aromatic diacids are dimethyl-, diethyl-, di-n-propyl-, di-n-butyl-, di-tert-butyl-, diisobutyl-, diglycol esters of isophthalic acid and terephthalic acid.

Examples of benzoates are diethylene glycol dibenzoate, triethylene glycol dibenzoate, and tripropylene glycol dibenzoate, cyclohexyl-, n-heptyl-, isoheptyl-, n-octyl-, isooctyl-, 2-ethylhexyl-, n-nonyl-, isononyl-, 3,5,5-trimethyl hexyl-, 2,6-dimethyl-4-heptyl, n-decyl-, isodecyl-, 2-propylheptyl-, n-undecyl-, isoundecyl-, n-dodecyl-, isododecyl-, n-tridecyl-, isotridecyl-, n-tetradecyl-, n-hexadecyl-, n-octadecyl-, isooctadecyl-ester of benzoic acid.

Examples of citrates are triethyl citrate, acetyl triethyl citrate, tributyl citrate, acetyl tributyl citrate and acetyl tri 2-ethylhexyl citrate.

Examples of phosphates are tri-2 ethyl hexyl phosphate, trioctyl phosphate, triphenyl phosphate, 2 ethyl hexyl isodecyl phosphate and 2-di-ethylhexyl phenyl phosphate.

Examples of sulfonates are the phenyl or the cresyl ester of pentadecyl sulfonic acid.

Isononylbenzoate, dibutyl terephthalate, diethylene glycol dibenzoate, acetyl tributyl citrate and mixtures thereof are the preferred second plasticizers.

All the individual combinations of the above-mentioned second plasticizers are also contemplated.

It is worthwhile noting that the first and second plasticizer may be interchanged, so that the plastisol or organosol comprises said second plasticizer and the first plasticizer is applied, in a pattern, on the deposited plastisol or organosol. As the person skilled in the art would understand from the present disclosure, the term "first" and "second" are merely for defining two groups of plasticizers, one defining a group of so-called fast-fusing plasticizers and another defining a group of so-called slow-fusing plasticizers. In other words, the plastisol may comprise the slow- or fast-fusing plasticizer and the other (fast- or slow-fusing, respectively) plasticizer may be applied, in a pattern, on the deposited plastisol.

According to an embodiment, the method comprises gelling one or more plastisol or organosol layers that are already applied on the substrate, preferably before applying a further plastisol or organosol layer.

The method may further comprise fusing the digitally embossed coating. According to an embodiment, the digitally embossed coating is fused (e.g. in an oven) at a temperature comprised in the range from 130° C. to 200° C., preferably in the range from 150° C. to 170° C.

The substrate may be monolayer or multilayer. In case the substrate comprises multiple layers, it may comprise at least one of a décor layer, a wear layer, one or more (structural) core layers and a backing layer.

"Décor layer" is used herein to indicate that the corresponding layer or surface remains visible in the final surface covering product when in use as intended and contributes to the outer appearance of the surface covering.

According to an embodiment, the substrate comprises a décor layer and the digitally embossing of the coating on the substrate is effected in register with the décor layer. The décor layer may comprise registration marks integrated within the décor pattern. Alternatively or additionally, registration marks may be provided on the one or more core layers, and/or backing layer.

As used herein, a "wear layer" is a layer improving the durability, stain and scratch resistance of the surface covering.

The wear layer may be a polyurethane wear layer. In another embodiment, the wear layer may be a PVC layer or a PVC layer with a polyurethane layer atop. The polyurethane composition for forming the wear layer may be water based and is preferably radiation curable.

The wear layer may have a thickness comprised in the range from 0.15 mm to 1 mm, preferably in the range from 0.2 mm to 0.5 mm and more preferably in the range from 0.2 mm to 0.4 mm.

According to an embodiment, the substrate comprises a wear layer on top of the décor layer.

Advantageously, the deposition of plastisol or organosol is effected so as to produce a thickness-modulated plastisol or organosol layer.

According to a preferred embodiment, the resilient multilayer decorative surface covering is provided as a slab.

According to a preferred embodiment, a PVC plastisol is used, i.e. the plastisol or organosol layers are PVC plastisol layers, and the plastisol or organosol is a PVC plastisol.

The method may comprise providing a three-dimensional model file to a digital embosser, the model file comprising instructions to the digital embosser for embossing the coating having the three-dimensional surface relief, the model file defining raised and depressed surface regions for the coating to be digitally embossed. In other words, the model file defines desired recesses and protrusion for the surface of the coating. The digitally embossing is performed by the digital embosser based on the three-dimensional model file. In other words, the digital embosser executes the instructions provided in the model file.

Preferably, the model file comprises instructions including a desired embossing pattern for at least one of the one or more plurality of plastisol or organosol layers.

A second aspect of the present invention relates to a resilient multilayer decorative surface covering produced in accordance with the method as disclosed hereinabove.

BRIEF DESCRIPTION OF THE DRAWINGS

By way of example, preferred, non-limiting embodiments of the invention will now be described in detail with reference to the accompanying drawings, in which.

The reader's attention is drawn to the fact that the drawings are not to scale. Furthermore, for the sake of clarity, proportions between height, length and/or width may not have been represented correctly.

DETAILED DESCRIPTION OF PREFERRED EMBODIMENTS OF THE INVENTION

Figure 1:
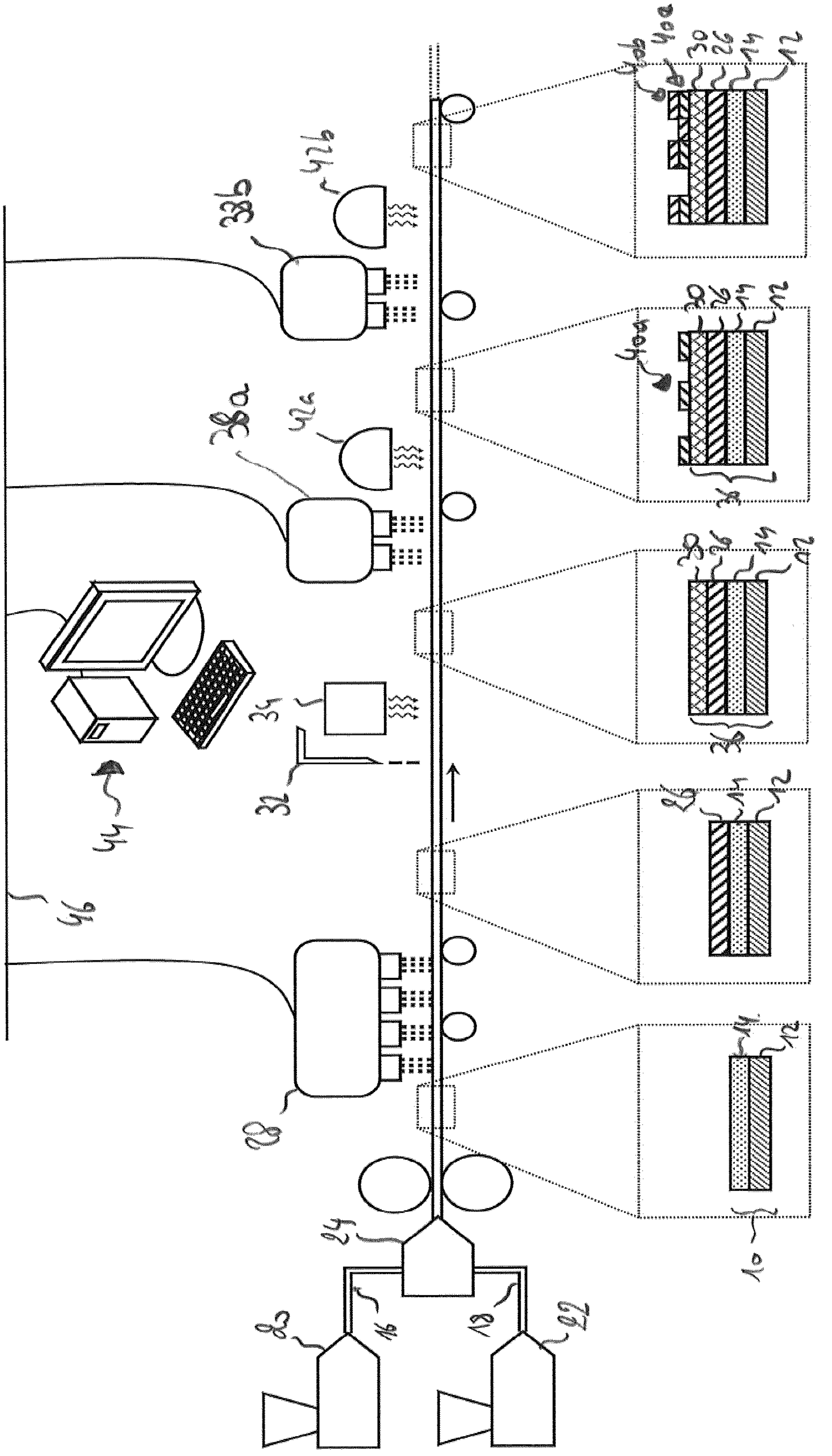
FIG. 1: is a schematic illustration of a production line for implementing a method of producing a resilient multilayer decorative surface covering according to an embodiment of the invention.

FIG. 1 illustrates a first embodiment of the proposed method for producing a resilient multilayer decorative surface covering. A digitally printable layer 10 is provided in the form of a support layer 12 coextruded with a core layer 14. Thermoplastic melt streams 16, 18 are guided from respective extruders 20, 22 to the co-extrusion die 24, where the digitally printable layer 10 is formed. The core layer 14 is illustrated in this example as a monolayer. The skilled person will understand that a multilayer core layer may be provided thanks to a suitable multi-manifold die, instead of a two-manifold die (as depicted). In case of a multilayer structure, the outmost layer of the core layer should be digitally printable. In an embodiment, the support layer 12 and the core layer 14 may be laminated.

As used herein, a digitally printable layer is a layer that is preferably substantially white, i.e. having a lightness L* defined in the CIELAB colour space greater than 80, preferably greater than 85 and even more preferably greater than 90. According to an embodiment, the digitally printable layer has a surface energy comprised in the interval between 15 mN/m and 60 mN/m, preferably in the interval from 20 mN/m to 50 mN/m and even more preferably in the interval from 25 mN/m to 40 mN/m. The digitally printable layer may have a surface roughness Ra of less than 0.5 μm, preferably of less than 0.3 μm and even more preferably of less than 0.2 μm. The digitally printable layer may have a surface roughness Rz of less than 5 μm, preferably of less than 3 μm and even more preferably of less than 2 μm. The surface roughness is measured according to ISO 4288:1996. According to an embodiment, the digitally printable layer has a gloss value at 60° comprised in the interval from 10 to 90, preferably in the interval from 20 to 80 and even more preferably in the interval from 25 to 75. The gloss value is measured according to EN ISO 2813:2014.

A two-dimensional décor layer 26 is then digitally printed on the core layer 14 of the digitally printable layer 10 using digital printing equipment 28, which includes, preferably, an industrial printer.

The two-dimensional décor layer is, preferably, at least one-dimensionally patterned, "at least one-dimensionally patterned" meaning that there are color or shade variations (preferably including plural gradients and/or steps) of the décor along at least one direction, the variation being noticeable to the naked human eye. More preferably, the décor has such variations in two mutually perpendicular directions.

The digital printing equipment 28 preferably projects ink droplets onto the digitally printable layer 10. Inks typically comprise one or more colorants, a binder that bonds the colorants to the surface and a carrier liquid. Colorants comprise dyes and/or pigments. Pigments are solid colorant particles that are suspended or dispersed in the carrier liquid. Pigment-based inks may be more lightstable and more fade-resistant than dye-based inks. Furthermore, dye-based inks often comprise organic solvents which may lead to higher VOC emissions than pigment-based inks, especially when water is the carrier liquid of the latter. Carrier liquids may include solvents, oil(s), water and polymeric resins. For certain surface coverings, radiation-curable inks may be considered as particularly advantageous.

The digital printing equipment 28 preferably comprises a Single-Pass industrial printer, which uses several printheads aligned side by side in several rows that cover (at least part of) the width of printing substrate. Each row of printhead may prints one or more colours. During the printing process, the printing substrate proceeds in the machine direction under the printheads. The digital printing equipment 28 could use thermal printhead technology, wherein a current pulse passing through a heating element vaporizes a tiny quantity of ink in a chamber so as to form a bubble, and this bubble propels an ink droplet through the printhead nozzle onto the printing substrate. The digital printing equipment 28 could also use piezoelectric printheads, wherein a piezoelectric element, on application of a voltage, generates a pressure pulse that drives an ink droplet through the nozzle. The ink is chosen in accordance with the printhead technology, the printing substrate, the subsequent processing steps as well as quality and price constraints.

The method may comprise a drying or curing step, wherein the digitally printed décor 26 is solidified and bonded to the digitally printable layer 10. To this effect, the digital printing equipment 28 may comprise one or more heaters, one or more blowers and/or one or more radiation sources, depending on the type of ink used.

Thereafter, a wear layer 30 is applied on the décor layer 26. In the present embodiment, the wear layer 30 is a radiation curable polyurethane layer. As depicted in FIG. 1, a coater 32 is used for applying the radiation curable polyurethane composition on the décor layer 26 and a UV source 34 is used for curing the radiation curable polyurethane composition, thereby forming the wear layer 30. The radiation curable polyurethane composition may be water-based. In another embodiment, the wear layer may be a PVC layer or a PVC layer with a polyurethane layer atop (e.g. the previously disclosed radiation curable polyurethane layer).

The wear layer 30 may have a thickness comprised in the range from 0.15 mm to 1 mm, preferably in the range from 0.2 mm to 0.5 mm and more preferably in the range from 0.2 mm to 0.4 mm.

At this stage, a substrate 36 for digitally embossing a PVC coating having a three-dimensional surface relief is provided. The substrate 36 comprises the support layer 12, the core layer 14, the décor layer 26 and the wear layer 30.

In the next step, the PVC coating is digitally embossed on the substrate 36 by a multi-stage PVC plastisol digital embossing equipment comprising a plurality of PVC plastisol digital embossers 38*a*, 38*b*. It will be readily understood by the person skilled in the art that a plastisol having a resin different from a PVC resin (e.g PMMA) or even an organosol may be used. For the sake of conciseness, the embodiment of PVC plastisol is described hereinafter. In FIG. 1, a two-stage digital embossing equipment (comprising two digital embossers in a row) is depicted. It will be readily understood that the number of digital embossers may be adapted as needed. Each stage sequentially adds a PVC plastisol layer and cooperates in order to digitally emboss a PVC coating having a three-dimensional surface relief.

Typical plasticizers that can be used are provided in the general description.

The PVC plastisol may contain from 15 to 200 parts of plasticiser per 100 parts of polyvinyl chloride resin. In a preferred embodiment, the PVC plastisol consists of plasticiser and PVC resin.

The PVC plastisol digital embossers may emboss the PVC coating in register with the décor layer 26. To this end, registration marks can be applied in or on the substrate 36 (e.g. on the wear layer or on the décor layer 26, during digital printing thereof).

If the presence of registration marks within the surface covering is deemed unwanted, the registration marks may be provided outside of the two-dimensional décor layer 26. For example, the décor layer 26 may not cover the entirety of the surface of the digitally printable layer 10, thereby leaving space for providing registration marks. These margins may be removed in a subsequent production step, when cutting the surface covering into slabs (see below-FIG. 4 reference sign 62).

The PVC plastisol digital embossers each use several PVC plastisol printheads aligned side by side in several rows that cover the width of décor layer 26. Each row of printhead may print one or more plastisol blobs.

According to an embodiment, the volume of the plastisol blobs are preferably comprised in the range from $10^{-6}$ L to $10^{-1}$ L (1 L=1 litre=1 $dm^3$), preferably in the range from $10^{-4}$ L to $10^{-1}$ L, even more preferably in the range from $10^{-3}$ L to $10^{-2}$ L. The blobs deposited on the substrate may have all the same volume or different volumes.

Each of the digital embossers applies a PVC plastisol layer 40*a*, 40*b* that may be homogeneous or structurally patterned. The structural pattern is provided by depositing, in a pattern, PVC plastisol on the substrate. In other words, the quantity of plastisol deposited on the substrate may be space-dependent, i.e. the quantity of plastisol may vary depending on the location on the substrate. For producing a homogeneous PVC plastisol layer, a uniformly thick layer is applied.

Before applying a further PVC plastisol layer, a gelling step is implemented. The gelling is carried out by heating (by a heater 42*a*, 42*b*—e.g. an oven) the deposited PVC plastisol to a temperature comprised in the range from 50° C. to 80° C., preferably in the range from 60° C. to 70° C. To this end, each stage of the multi-stage PVC plastisol digital embosser equipment comprises a heater 42*a*, 42*b* for gelling the deposited PVC plastisol.

For the sake of clarity, the figures in the present document illustrate the plurality of PVC plastisol layers as separate layers during the PVC plastisol digital embossing. It should however be understood that interdiffusion between the layers will occur, thereby forming an integral, monolithic, PVC coating.

The digital printing of the décor layer and the digital embossing of the PVC coating is controlled by one or more control computers 44 that are connected via network wires 46 to the digital printing equipment 28 and the PVC plastisol digital embossers 38*a*, 38*b*. In an embodiment at least part (if not all) of the network wires 46 may be replaced by one or more wireless connections. The one or more control computers 44 provide instructions to the printer 28 comprising ink volumes, specific colors and/or application locations and embossers 38*a*, 38*b* comprising plastisol volumes, specific colors and/or application locations. The instructions are provided to the digital printers and embossers in any suitable format, e.g. as a file, a set of files, a stream, data packets, etc., in accordance with the specifications (e.g. the API) of the printers.

Figure 2:
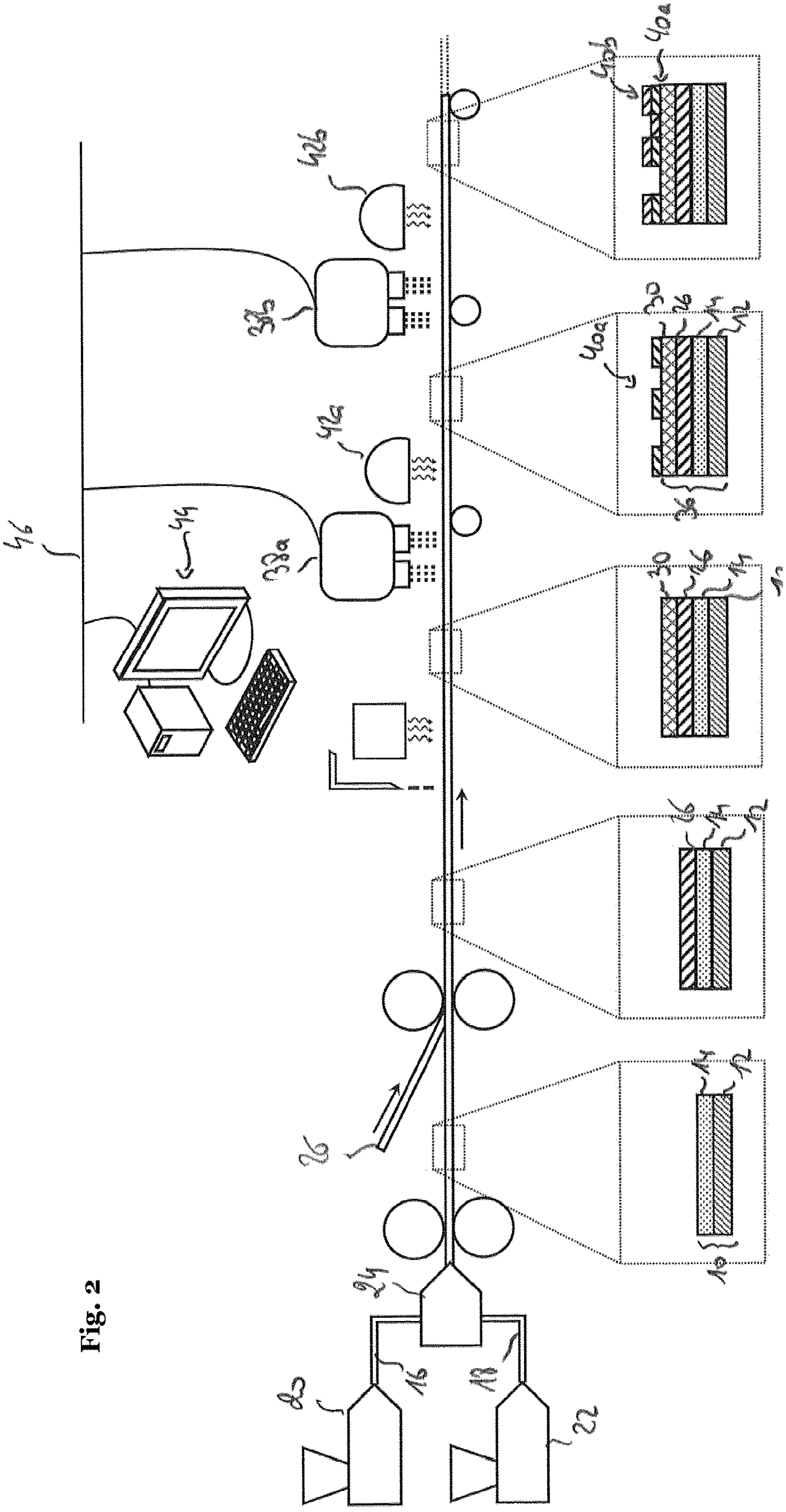
FIG. 2: is a schematic illustration of a production line for implementing a method of producing a resilient multilayer decorative surface covering according to an embodiment of the invention.

FIG. 2 shows another embodiment of the present invention, which differs from the embodiment depicted in FIG. 1 in that the décor layer is laminated with the layer 10. In this case, the layer 10 may not satisfy the requirements of a digitally printable layer.

Figure 3:
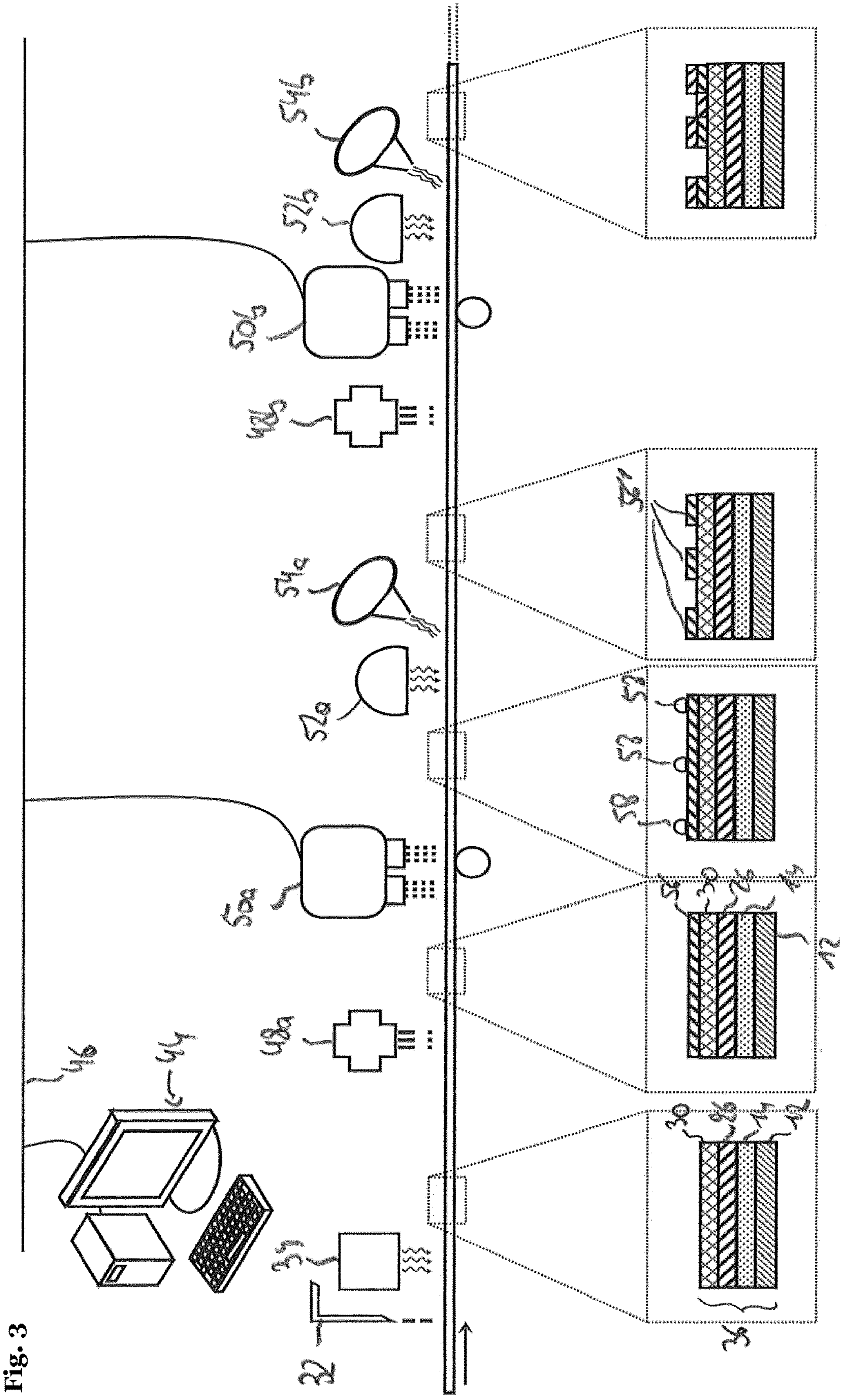
FIG. 3: is a schematic illustration of a production line for implementing a method of producing a resilient multilayer decorative surface covering according to an embodiment of the invention.

FIG. 3 illustrates a further embodiment of the present invention, which differs from the previous embodiments in that the digitally embossing of the PVC coating on the substrate is carried out differently. A multi-stage plasticizer digital embossing equipment is used. Each stage of the multi-stage digital embosser comprises a digital plasticizer jetter 50*a*, 50*b* and a plastisol coater 48*a*, 48*b* upstream of the digital plasticizer jetter 50*a*, 50*b*. In addition, each stage of the multi-stage digital embosser comprises, downstream of the digital plasticizer jetter 50*a*, 50*b*, a heater 52*a*, 52*b* (e.g. an oven) and an ungelled plastisol removal tool 54*a*, 54*b*. In FIG. 3, a two-stage digital embosser equipment (comprising two digital embossers in a row) is depicted. It will be readily understood that the number of digital embossers may be adapted as needed. Each stage sequentially provides a PVC plastisol layer (patterned or not) and cooperates in order to digitally emboss a PVC coating having a three-dimensional surface relief.

The plastisol coater 48*a* applies a PVC plastisol layer 56 on the substrate. The PVC plastisol may be spread over the entire surface of the substrate. Alternatively, it may be spread only on a portion of the substrate, e.g. for leaving space for registration marks. The applied plastisol comprises a slow-fusing plasticizer selected e.g. from the list of first plasticizers provided above (or a combination thereof). The PVC plastisol has an initial gelation temperature.

The digital plasticizer jetter 50*a* applies (e.g. projects), in a pattern, a fast-fusing plasticizer 58 on the PVC plastisol layer 56, which will diffuse in the PVC plastisol layer 56. The fast-fusing plasticizer 58 has a lower solution temperature at the clear point than the solution temperature at the clear point of the slow-fusing plasticizer. The PVC plastisol layer 56 thus includes locations with slow-fusing plasticizer and other locations with a combination of slow-fusing plasticizer and fast-fusing plasticizer. These other locations have a lower gelling temperature.

By adequately setting the heater 52*a* (e.g. temperature, time of residence of the plastisol in the heater, etc), the PVC plastisol is heated to a heating temperature comprised between the lowest gelation temperature and the highest gelation temperature of the PVC plastisol, thereby selectively gelling the locations having a gelation temperature that is lower than the heating temperature. Consequently, the PVC plastisol layer comprise gelled locations and ungelled locations. The gelled locations correspond to locations where the digital plasticizer jetter 50*a* has applied the fast-fusing plasticizer 58 and the locations where the fast-fusing plasticizer 58 has diffused.

The heater 52*a* may be set so that PVC plastisol is heated at a heating temperature comprised in the range from 50° C. to 80° C., preferably in the range from 60° C. to 70° C.

Thereafter, the ungelled plastisol removal tool 54*a* removes the ungelled PVC plastisol so as to selectively keep the gelled PVC plastisol on the substrate and selectively remove the ungelled PVC plastisol from the substrate, thereby producing a structurally patterned PVC plastisol layer 56'. The removal tool 54*a* may remove the ungelled plastisol by brushing, blowing (e.g. using an air knife or the like)) and/or scraping.

The removed ungelled plastisol may reused (e.g. in the coater 48*a*, 48*b*) for applying further PVC plastisol layers.

It will be understood that, in an embodiment, the coater 48*a* may apply a plastisol comprising a fast-fusing plasticizer (or a combination thereof) selected e.g. from the list of second plasticizers provided above. In that case, the digital embosser 50*a* applies a slow-fusing plasticizer and the gelled locations correspond to the locations where the digital plasticizer jetter 50*a* has not applied the slow-fusing plasticizer 58 (and where the slow-fusing plasticizer has not diffused).

The same steps are repeated in the following digital embossing stage(s).

Of course, each digital embossing stage may operate differently, e.g. a first stage may apply a plastisol having a slow-fusing plasticizer and apply a fast-fusing plasticizer thereon. For a second stage, it may be the other way around. The third stage may even be implemented according to the embodiment depicted in FIG. 1.

It should be noted that some of the PVC plastisol layers 40*a*, 40*b* may be structurally homogenous (i.e. not comprise a structural pattern). The thickness of such a PVC plastisol layer is not modulated by the digital embosser of a particular stage.

The depth, i.e. the (maximum) amplitude of the thickness variations of the PVC coating layer preferably ranges from 50 μm to 300 μm, but depths are possible, e.g. from 50 μm to 500 μm.

Figure 4:
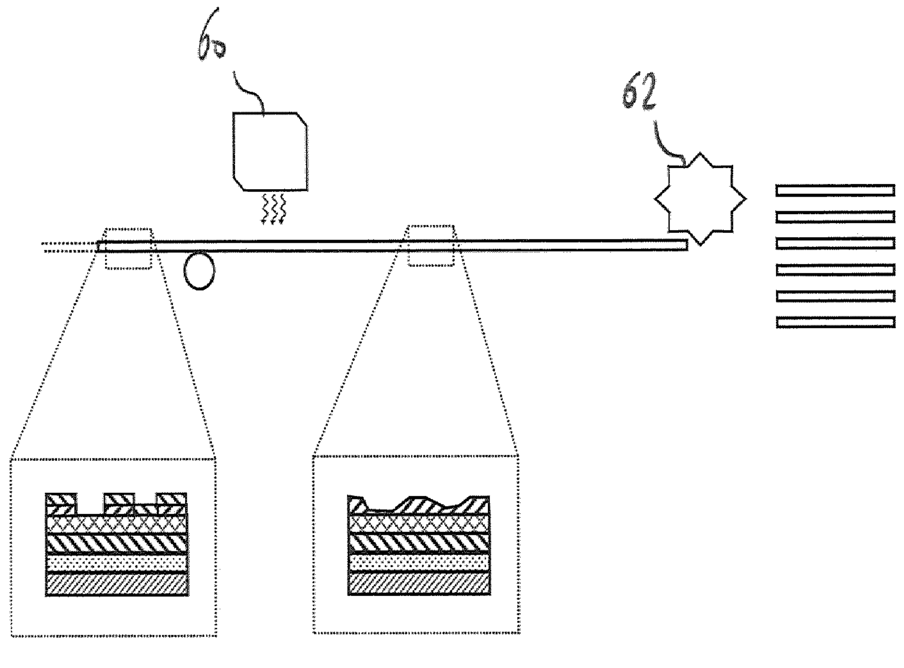
FIG. 4: is a schematic illustration of a production line for implementing a method of producing a resilient multilayer decorative surface covering according to an embodiment of the invention.

FIG. 4 illustrates an embodiment of the method for producing a resilient multilayer decorative surface covering, downstream of the digital embossing of the PVC coating on the substrate.

The digitally embossed PVC coating substrate is heated in the next step in order to fuse the PVC coating. The fusing of the PVC coated substrate is carried out by a heater 60 (e.g. an oven). The digitally embossed PVC coating may be fused at a temperature comprised in the range from 130° C. to 200° C., preferably in the range from 150° C. to 170° C.

In the next step, the surface covering is cut into slabs by a cutter 62.

It should be noted that the step of cutting the surface covering may be carried before the digital embossing of the PVC coating or even between two stages of digital embossing.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for producing a resilient multilayer decorative surface covering, the method, comprising:

providing a substrate; and digitally embossing a coating on the substrate, wherein digitally embossing the coating comprises applying a plurality of plastisol or organosol layers so as to confer to the coating a three-dimensional surface relief, wherein at least one of the plurality of plastisol or organosol layers is structurally patterned;

wherein applying the plurality of plastisol or organosol layers comprises:

depositing plastisol or organosol on the substrate, the plastisol or organosol comprising a first plasticizer having a first solution temperature at the clear point, measured according to DIN 53408:1967-06 (5% S-PVC; K-value 71), the plastisol or organosol having an initial gelation temperature;

applying, in a pattern, a second plasticizer on the deposited plastisol or organosol, the second plasticizer having a second solution temperature at the clear point, measured according to DIN 53408:1967-06 (5% S-PVC; K-value 71), the second solution temperature at the clear point being different from the first solution temperature at the clear point, so as to impart to the deposited plastisol or organosol a spatially modulated gelation temperature between a lowest gelation temperature and a highest gelation temperature;

heating the plastisol or organosol to a heating temperature comprised between the lowest gelation temperature and the highest gelation temperature of the plastisol or organosol so as to selectively gel the plastisol or organosol in areas where the gelation temperature is lower than the heating temperature; and removing the plastisol or organosol so as to keep the selectively gelled plastisol or organosol areas on the substrate, thereby producing a structurally patterned plastisol or organosol layer.

2. The method according to claim 1, wherein depositing plastisol or organosol comprises depositing one or more plastisol or organosol blobs on the substrate.

3. The method according to claim 1, wherein applying the plurality of plastisol or organosol layers comprises gelling one or more plastisol or organosol layers that are already applied on the substrate.

4. The method according to claim 1, further comprising fusing the digitally embossed coating.

5. The method according to claim 1, wherein the substrate comprises a décor layer, digitally embossing of the coating on the substrate being effected in register with the décor layer.

6. The method according to claim 1, wherein depositing plastisol or organosol is effected so as to produce a thickness-modulated plastisol or organosol layer.

7. The method according to claim 5, wherein the substrate comprises a wear layer on top of the décor layer.

8. The method according to claim 1, wherein the resilient multilayer decorative surface covering is provided as a slab.

9. The method according to claim 1, wherein the plastisol or organosol layers are PVC plastisol layers, and the plastisol or organosol is a PVC plastisol.

10. The method according to claim 1, comprising:

providing a three-dimensional model file to a digital embosser, the model file comprising instructions to the digital embosser for embossing the coating having the three-dimensional surface relief, the model file defining raised and depressed surface regions for the coating to be digitally embossed;

wherein the digitally embossing is performed by the digital embosser based on the three-dimensional model file.

11. The method according to claim 10, wherein the model file comprises instructions including a desired embossing pattern for at least one of the one or more plurality of plastisol or organosol layers.

12. A method for producing a resilient multilayer decorative surface covering, the method comprising:

providing a substrate; and digitally embossing a coating on the substrate, wherein digitally embossing the coating comprises applying a plurality of plastisol or organosol layers so as to confer to the coating a three-dimensional surface relief, wherein at least one of the plurality of plastisol or organosol layers is structurally patterned;

wherein applying the plurality of plastisol or organosol layers comprises depositing, in a pattern, plastisol or organosol on the substrate so as to produce a plastisol or organosol layer that is structurally patterned, the depositing comprising:

depositing plastisol or organosol on the substrate, the plastisol or organosol comprising a first plasticizer having a first solution temperature at the clear point, measured according to DIN 53408:1967-06 (5% S-PVC; K-value 71), the plastisol or organosol having an initial gelation temperature; and applying, in a pattern, a second plasticizer on the deposited plastisol or organosol, the second plasticizer having a second solution temperature at the clear point, measured according to DIN 53408:1967-06 (5% S-PVC; K-value 71), the second solution temperature at the clear point being different from the first solution temperature at the clear point, so as to impart to the deposited plastisol or organosol a spatially modulated gelation temperature between a lowest gelation temperature and a highest gelation temperature;

heating the plastisol or organosol to a heating temperature comprised between the lowest gelation temperature and the highest gelation temperature of the plastisol or organosol so as to selectively gel the plastisol or organosol in areas where the gelation temperature is lower than the heating temperature; and removing the plastisol or organosol so as to keep the selectively gelled plastisol or organosol areas on the substrate, thereby producing a structurally patterned plastisol or organosol layer.

13. The method according to claim 3, wherein the gelling of the one or more plastisol or organosol layers that are already applied on the substrate, is carried out before applying a further plastisol or organosol layer.

* * * * *